J. SCHÜTTE.
BALLOON FORM.
APPLICATION FILED JULY 2, 1909.

999,469.

Patented Aug. 1, 1911.

Witnesses.
Jesse K. Lutton
C. W. Sommers

Inventor.
Johann Schütte
by Henry Orth
Atty.

UNITED STATES PATENT OFFICE.

JOHANN SCHÜTTE, OF LANGFUHR, NEAR DANZIG, GERMANY.

BALLOON-FORM.

999,469.   Specification of Letters Patent.   Patented Aug. 1, 1911.

Application filed July 2, 1909. Serial No. 505,692.

*To all whom it may concern:*

Be it known that I, JOHANN SCHÜTTE, a subject of the King of Prussia, residing at 47ᵇ Jäschkenthalerweg, Langfuhr, near Danzig, Germany, have invented certain new and useful Improvements in Balloon-Forms; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to balloons for air ships and has for its object a form and construction of a balloon having ends of reduced diameter or pointed so as to give a minimum resistance to the travel of the air ship, said balloon having substantially definite mathematical dimensions.

Figure 1:
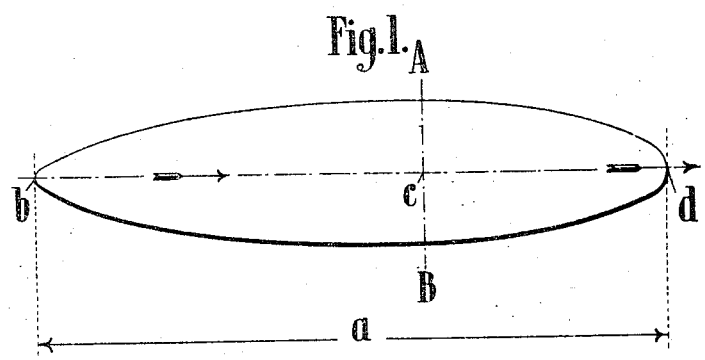
Figure 2:
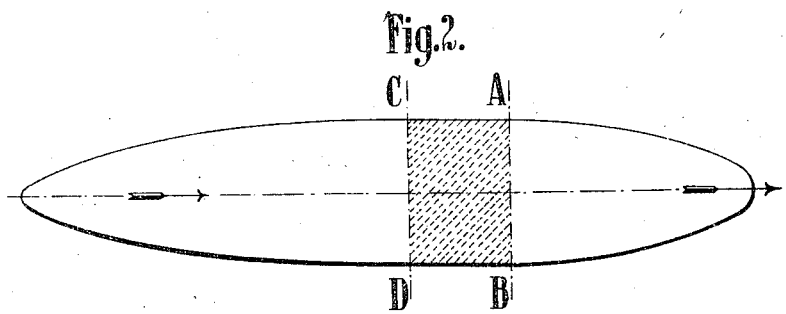

Referring to the drawings, in which like parts are similarly designated, Figure 1 illustrates the outline or side elevation of a balloon made in accordance with my invention. Fig. 2 is a similar view of a modification.

Extensive researches have shown that when a closed body having rounded ends is moved through the air the smallest resistance of such a body during its movement will be when the dimensions of this body are such that its greatest breadth or thickness is located from the forward end from between one-third to two-fifths of its length, in other words, the greatest cross section will be about at the golden section of the length of the body and especially will the resistance of such a body be smallest when the ends of the balloon consist of or have curvature corresponding to conic sections of rotation. Experiments have further shown that for practical reasons the diameter of the greatest cross section of the balloon should not be increased when increasing the length, consequently there is inserted between the pointed ends, which are proportioned in length as above described, a cylindrical center piece of the maximum transverse diameter while the ends maintain their same lengths, that is the forward end must be from one-third to two-fifths and the rear end from two-thirds to three-fifths of the sum of the lengths of the two ends on each side of the cylindrical portion.

An inspection of Fig. 1 will show that the short forward end *c d* and the long rear end are paraboloids or similar bodies whose longitudinal central section will give a conic section. The greatest transverse diameter is on the line A—B through the point *c* dividing the line *b—d* or the total length *a* of the balloon at about the golden section, in other words *b—c* is a mean proportion between *b—d* and *c—d*.

In the form shown in Fig. 2 the ends of the balloon are maintained at the same proportion to one another as in Fig. 1 and there is inserted between the ends a cylindrical portion A—B—C—D shown by the hatched portion of the figure.

Actual experiments with balloons made in accordance with my invention show a minimum resistance to their passage through the air.

I claim:—

1. A balloon whose ends have the form of conic sections of rotation and whose maximum cross section is substantially at the golden section of the sum of the lengths of these ends.

2. A balloon whose ends have the form of paraboloids and whose maximum cross section is substantially at the golden section of the sum of the lengths of these paraboloid ends.

3. A balloon whose ends have the form of conic sections of rotation, the forward end being shorter than the rear end and the rear end being tapered to a greater extent than the forward end and its maximum cross section is substantially at the golden section of the sum of the lengths of these ends.

4. A balloon whose ends have the form of conic sections of rotation and whose maximum cross section is substantially at the golden section of the sum of the lengths of these ends and a cylindrical portion interposed between the ends of their maximum section.

5. A balloon whose ends have the form of paraboloids and whose maximum cross section is substantially at the golden section of the sum of the lengths of these ends and a